Figure 1:
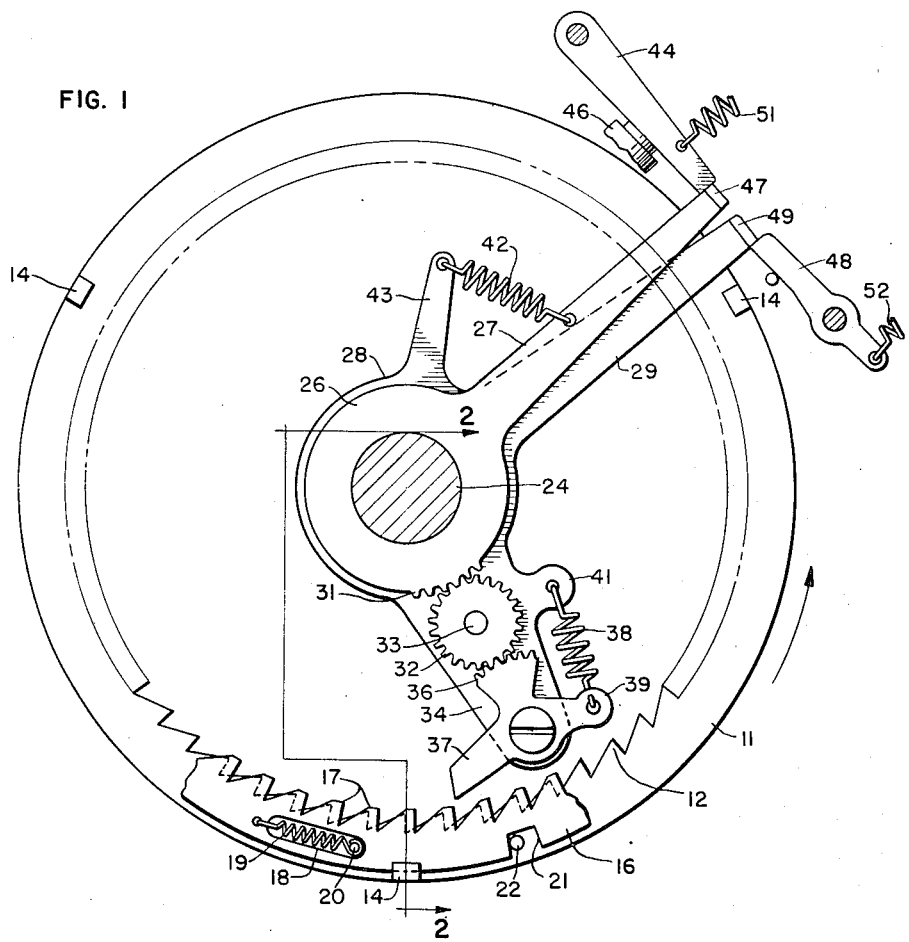

Sept. 11, 1956 W. J. ZENNER 2,762,477
POSITIVE ENGAGING CLUTCH
Filed Oct. 2, 1951

INVENTOR
WALTER J. ZENNER
BY Emery Robinson
ATTORNEY

United States Patent Office 2,762,477
Patented Sept. 11, 1956

2,762,477
POSITIVE ENGAGING CLUTCH

Walter J. Zenner, Des Plaines, Ill., assignor to Teletype Corporation, Chicago, Ill., a corporation of Delaware Application October 2, 1951, Serial No. 249,285

11 Claims. (Cl. 192—28)

This invention relates to a positive engaging clutch and more particularly to a clutch having toothed engaging elements wherein the clutching operation results in a full engagement between the toothed engaging elements.

In clutches used in start-stop telegraph apparatus, it is of utmost importance that the clutch elements instantaneously engage and further, that such engagement be continuous without subsequent slippage during the period of the operation of the telegraph apparatus. Heretofore, clutches utilized in telegraph apparatus have been primarily of the friction disc type. Positive engaging clutches do not readily adapt themselves to accommodation in telegraph apparatus because there is a tendency for prevailing clutches to slip during the initial portion of the engaging operation. This impediment is especially perceptible in clutches wherein a toothed engaging member, movably mounted on the driven member, is brought into engagement with a toothed driving member. Upon a number of such engagements, the invariable result is that the toothed engaging member ultimately hangs upon or partially engages the tooth or the teeth on the driving member. This partial engagement of the toothed elements results in a greatly increased stress being imparted to the engaged areas of the toothed members causing said teeth to eventually fracture or chip. It has also been observed that when the toothed clutch members have been partially engaged, slippage has resulted between the driving and driven toothed members.

The present invention though exemplified by an application to clutches used in telegraph apparatus is not to be construed as limited to such an application since the clutch can be advantageously utilized in many diversified types of apparatus wherein it is desirous to obtain an instantaneous clutching action without subsequent slip or breakage of the clutch elements.

Significantly, it is one of the primary objects of this invention to provide an internal tooth drum type clutch wherein a full positive engagement is secured between the clutch elements without any subsequent fracturing or chipping of the elemental parts.

A second object of this invention is to provide a toothed drum type clutch wherein a positive clutching action takes place instantaneously upon initiation of the clutching action and said positive clutching action continues during the entire period of the engagement of the clutch members.

It is a further object of this invention to provide a clutch wherein a toothed driven member is radially brought into initial contact with a first toothed driving member causing said first toothed driving member to move relative to a laterally positioned second toothed member whereby the toothed driven member is permitted to move into full engagement with the second toothed driving member.

Still another object of the invention is the provision of a drum type clutch having elements in which the desired engaging functions are performed as a result of the inertia of the driven members and the momentum of the driving members.

With these and other objects in view the present invention contemplates a driving member in the form of a flanged disc having a plurality of serrations or teeth formed along the inner peripheral surface of the flanged portion of the disc. Slidably mounted on the flanged portion of the disc is a ring having serrations or teeth formed along its inner peripheral surface. Resilient biasing means are provided to maintain the ring in such a relative position with respect to the flanged disc that the teeth or serrations of the ring overlap the teeth or serrations of the flanged driving disc. A toothed member is pivotally mounted on the driven member and is normally maintained out of engagement with the toothed driving elements through a suitable linkage and gear mechanism which is controlled through the instrumentality of a control magnet of a start-stop telegraph apparatus.

In order to operate the clutch, a suitable signal is received by the control magnet to release the linkage mechanism whereupon the toothed driven member is moved into engagement with the toothed ring. The inertia of the driven member and the momentum of the driving members are sufficient to cause the ring to move against the influence of the resilient biasing means to move the teeth of the ring into alignment with the teeth of the flanged driving disc. During the movement of the ring relative to the flanged driving disc, the toothed driven member is continually urged into the full depth between the teeth on the flanged driving disc. Upon the attainment of the toothed driven member within the full depth between the teeth on the flanged driving disc and the positioning of the teeth on the ring in alignment with the teeth on the flanged driven disc, the train of driving power is transferred from the teeth on the ring to the teeth on the flanged driving disc.

Figure 2:
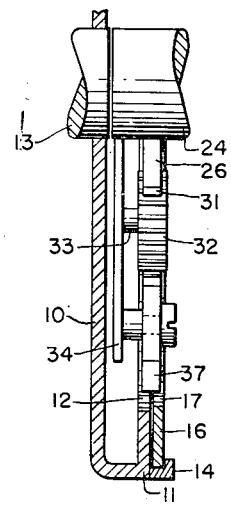

Other objects and advantages of the present invention will be apparent from the following detailed description when considered with the accompanying drawing wherein:

Fig. 1 discloses a front elevational view of a positive engaging clutch embodying the principal features of the invention; and Fig. 2 is a sectional view of the clutch elements taken along line 2—2 of Fig. 1, looking in the direction indicated by the arrows.

Referring to the drawing a driving disc is designated by the reference numeral 10 and has integrally formed thereon a flanged portion 11. A plurality of evenly spaced teeth or serrations 12 are formed along the inner peripheral surface of the flanged portion 11 of the driving disc 10. The driving disc 10 is secured to a driving shaft 13 which is continuously rotated by any suitable source of rotative power such as an electric motor utilized to drive various other components in a printing telegraph apparatus. Secured to and uniformly spaced along the lateral face of the flanged portion 11 are a number of L-shaped guide brackets 14. Positioned within the guide brackets 14 is a ring 16 having a plurality of evenly spaced teeth or serrations 17 formed along its inner peripheral surface. The circular pitch of the teeth or serrations formed on the ring 16 is substantially identical with the circular pitch of the teeth or serrations 12 formed on the flanged portions 11 of the driving disc 10.

The ring 16 is provided with an elongated longitudinal slot 18 into which is fitted a biasing spring 19 having one end thereof connected to the ring 16 and the other end to a stud 20 secured to the flanged portion 11 of the driving disc 10. A second relatively short slot 21 is formed along the outer periphery of the ring 16 and positioned within the slot 21 is a pin 22 secured to the face of the flanged portion 11 of the disc 10. The spring 19 urges the ring in a counterclockwise direction relative to the disc 10 and the pin 22 limits this relative movement to position the teeth or serrations 17 in overlapping relation with the teeth or serrations 12.

The driven elements of the clutch include a driven shaft 24 having rotatably mounted thereon a hub 26 of an operating arm 27 which extends beyond the periphery of the disc 10. Fixed to the shaft 24 is a hub 28 having formed integral therewith a holding arm 29 also extending beyond the periphery of the disc 10. The hub 26 as a plurality of gear teeth 31 formed along a portion of its outer surface. The teeth 31 are maintained in mesh with the teeth of a pinion 32 rotatably mounted on an axle 33 secured to an extension 34 of the hub 28. Engaging the teeth of the pinion 32 is a gear segment 36 forming a part of an engaging pawl 37 which is rotatably mounted on the extension 34. A relatively strong spring 38 interconnects an eye 39 formed on the heel of the pawl 37 and an eye 41 formed on the extension 34 to urge the pawl 37 toward the teeth 17 of the ring 16.

The operating arm 27 is resiliently biased by a spring 42 interconnecting the operating arm 27 and a second extension 43 formed on the hub 28. In the disengaged condition of the clutch, the spring 42 is maintained extended by the relative position of the hubs 26 and 28 which maintains the extension 43 spaced from the operating arm 27. In the disengaged position, a pivotally mounted armature 44 of a start-stop telegraph magnet 46 engages a dog 47 formed on the tip of the operating arm 27 to hold said arm in position against the effect of the extended spring 42. The hub 28 is maintained in position through the agency of a rotatably mounted anti-backlash latch 48 which engages a dog 49 formed integral with the tip of the holding arm 29 connected to the hub 28. A spring 51 is connected to the armature 44 and tends to thrust the armature 44 out of engagement with the dog 47, but the magnet is normally energized to overcome the effect of the spring. A spring 52 secured to one end of the anti-backlash latch 48 urges said latch into contact with the dog 49, hence retrograde movement of the driven elements of the clutch is prevented.

In operation of the clutch, a no current or spacing impulse is received by the magnet 46 whereupon the magnet is de-energized to release the armature 44 from engagement with the dog 47. The operating arm 27 moves under the impetus of its spring 42 to move the hub 26. Movement of the hub 26 causes the gear teeth 31 to rotate the pinion 32, consequently causing the pawl 37 to pivot into engagement with a tooth 17 of the moving driving ring 16. It is to be noted at this time that the movement of the pawl 37 is also abetted by the potential energy of the extended spring 38; hence the movement of the pawl 37 under the impetus of the springs 38 and 42 results in an instantaneous engagement of the clutching elements.

The engagement of the pawl 37 with a tooth 17 of the ring 16 causes said ring to move in a clockwise direction relative to the moving driving flange 11 against the influence of the spring 18. The movement of the ring 16 relative to flange 11 is a result of the momentum of the driving members overcoming the inertia of the driven members. As the spring 18 is extended the pawl 37 is continuously urged by the strong spring 38 further into the space between the teeth 17. Obviously, since the ring 16 is resiliently mounted, the intial shock of the impact of the pawl 37 on the engaged tooth 17 is substantially dissipated by extending the spring 18. This slight relative movement of the ring 16 allows the driven members of the clutch to be gradually brought up to speed of the driving disc 10. Movement of the ring 16 with respect to the flange 11 continues until the faces of the teeth 17 are in alignment with the faces of the teeth 12 whereupon the pawl 37 engages a tooth 12 to transfer the train of power from the engaged tooth 17 to the engaged tooth 12. This transfer of the train of power occurs after the pawl 37 is fully positioned within the space between a pair of teeth 12, hence when the driving load is transferred from the teeth 17 to the teeth 12 the stress concentration imparted to the pawl 37 is relatively low since the driving force of the driving members is now applied over the relatively large engaged areas of the full face of the pawl 37 and the engaged tooth 12. Obviously the intial engagement of the pawl 37 with a tooth 17 need only be a partial engagement since the force of the initial engagement is partially dissipated in extending the spring 18; therefore, the stress encountered by the pawl 37 and the engaged tooth 17 is relatively low. The low stress encountered by the pawl 37 and the engaged tooth 17 precludes any possibility of stress failure in these elements which would result in fracturing or chipping of the elements hence any contingency of subsequent slippage of the clutch elements is eliminated.

In order to disengage the clutch, a current or marking impulse is received by the magnet 46 whereupon the magnet is energized to attract the armature 44 against the effect of the spring 51 into the position shown in Fig. 1. As the clutch elements rotate, the dog 47 is brought into engagement with the armature 44 thereby preventing further movement of operating arm 27. The momentum imparted to the driven elements is sufficient to carry the dog 49 and operating arm 29 past the latch 48 causing said latch to pivot outwardly as the dog 49 passes the latch and to pivot under the influence of its spring into position to engage the dog 49 to prevent any retrograde movement of the dog 49 and the driven elements connected thereto. The momentum imparted to the driven elements is gradually overcome by the extension of the spring 42 now held stationary at one end by the operating arm 27.

Due to the momentum imparted to the driven elements and the abrupt halting of the movement of the operating arm 27 by the armature 44, there exists a slight relative movement between these elements during the period the momentum of the driven elements is being overcome by the extension of the spring 42. This movement of the operating arm 29 and its associated elements including the extension 34 causes the pinion 32 to move over the teeth 31 of the now stationary hub 26 of the operating arm 27 resulting in counterclockwise movement being imparted to the pinion 32. Since the pinion 32 meshes with the teeth of the gear segment 36, a clockwise movement is imparted to the pawl 37 causing the pawl 37 to pivot against the effect of the spring 38 to remove the engaged tip of the pawl 37 from engagement with the tooth 12 of the flanged portion 11 of the driving disc 10. Therefore, the clutching connection between the driving and driven elements is discontinued and the elements assume their normal unoperated positions as illustrated in Fig. 1.

It is to be understood that the above described arrangements of apparatus and construction of clutch elements are simply illustrative of an application of the principles of the invention and many other modifications may be made without departing from the spirit and scope of the invention. It is to be particularly noted that the embodiment described, sets forth only a single pawl 37 but it is easily within the providence of any one skilled in the art to provide additional pawls and actuating gears or other actuating instrumentalities which would be operated simultaneously to move a plurality of pawls into clutching position in a manner substantially similar to the movement of the single disclosed pawl 37 into engagement with the tooth 17 on the ring 16.

What is claimed is:

1. In a positive engaging clutch, a driving member adapted to rotate in a predetermined direction, a multi-toothed engaging member movably mounted on the driving member, means for urging the engaging member in the direction of movement of the driving member, a driven member, an instrumentality movably mounted on the driven member, a means for radially moving the instrumentality into engagement with a tooth of the engaging member whereby the inertia of the driven member causes the engaging member to move relative to the driving member.

2. In a positive engaging clutch, a driving means having a first group of radially extending engaging members thereon, a second group of radially extending engaging members movably mounted on the driving means, means for urging the second group of engaging members into lateral overlapping relation with the first group of engaging members, a driven member, an instrumentality movably mounted on the driven member, and means for radially moving the instrumentality into engagement with one of the second engaging members whereby the inertia of the driven member causes the second group of engaging members to move relative to the first group of engaging members to bring the instrumentality into engagement with one of the first engaging members.

3. In a positive engaging clutch, a driving member having a first engaging means fixed thereto, a second engaging means slidably mounted on the driving member, means connected to the driving member for biasing the second engaging means to a predetermined position, a driven member, an instrumentality movably mounted on the driven member, means for urging the instrumentality into engagement with the second engaging means, latching means for holding the instrumentality against the effect of the urging means, and means for releasing the latching means to move the instrumentality into contact with the second engaging means whereby the inertia of the driven member causes the second engaging means to move from the predetermined position against the effect of the biasing means to bring the instrumentality into contact with the first engaging means.

4. In a positive engaging clutch, a multi-toothed driving member, a second toothed member movably mounted on the driving member, means for biasing the second toothed member to a position whereby the teeth of the second member overlap the teeth of the driving member, a driven member, an instrumentality pivotally actuated to the driven member, and means for pivoting the instrumentality into engagement with a tooth on the second toothed member whereby the inertia of the driven member causes the second toothed member to move relative to the driving member against the effect of the biasing means to bring the instrumentality into engagement with a tooth on the driving member.

5. In a positive engaging clutch, a multi-toothed driving member, a toothed ring slidably mounted on the driving member, resilient means interconnecting the ring and driving member for maintaining the teeth of the ring in overlapping relationship with the teeth of the driving member, a driven member, an engaging member pivotally mounted on the driven member, and means for moving the engaging member into engagement with a tooth on the ring whereby the inertia of the driven member causes the ring to move relative to the driving member during the pivotal movement of the engaging member, said pivotal movement continuing until the teeth of both the ring and the driving member are in alignment with each other, whereby the driving power is transferred from the engaged tooth on the ring to the engaged tooth on the driving member.

6. In a positive engaging clutch, a multi-toothed driving member, a toothed element slidably mounted on the driving member, means for urging the toothed element into position whereby the teeth of the toothed element laterally overlay the teeth of the driving member, a driven member, an instrumentality movably mounted in the driven member, means for urging the instrumentality toward the toothed element, means for maintaining the instrumentality out of engagement with the toothed element, and means for releasing the maintaining means whereupon the instrumentality is moved into engagement with a tooth of the toothed element, said engaging action causing said toothed element to move relative to the driving member to bring the teeth into alignment with each other and the instrumentality into engagement with a tooth of the driving member.

7. In a positive engaging clutch, a driving drum having teeth formed along its inner peripheral surface, a ring having teeth formed along its inner peripheral surface, a plurality of spaced guide brackets connected along the outer periphery of the driving drum for rotatably positioning the ring, means for limiting the relative movement of the ring within the guide brackets, resilient means for urging said ring against said limiting means to maintain the teeth of the ring in overlapping relationship with the teeth of the driving drum, a driven member, an engaging member movably mounted on the driven member, and means for moving the engaging member into engagement with a tooth on the ring whereby the inertia of the driven member moves the ring relative to the driving member to bring the teeth of the ring into alignment with the teeth of the driving member, the alignment of the teeth resulting in a transfer of driving power from the ring to the driving drum.

8. In a positive engaging clutch, a driving drum having teeth formed on its inner peripheral surface, a ring having teeth formed on its inner peripheral surface, means on the driving drum for slidably mounting the ring thereon, biasing means interconnecting the ring and the drum, a stop for limiting the movement imparted to the ring by the biasing means whereby the ring is maintained in a position so that the teeth of the ring overlap the teeth of the drum, a driven member, a pawl pivotally mounted on the driven member, a spring interconnecting the pawl and the driven member for urging the pawl into engagement with the teeth of the ring, an actuator for controlling the position of the pawl, means for engaging the actuator to hold the pawl out of engagement with the teeth of the ring and means for releasing the actuator whereby the actuator moves the pawl into engagement with one of the teeth of the ring, said ring being restrained from movement by the inertia of the driven member causing the ring to move against the biasing means to bring the teeth of the ring in alignment with the teeth of the drum whereby the tooth of the drum is engaged by the pawl at the full depth of the tooth.

9. An engaging unit for a positive engaging clutch which comprises a driven member, a pawl pivotally mounted on the driven member, a controller movably mounted on the driven member, said controller having formed thereon means for engaging and positioning the pawl, an operating arm pivotally mounted for engaging and controlling the position of the controller, a spring interconnecting the pawl and the driven member for urging the pawl in a predetermined direction whereby the controller and operating arm are urged to move, means for restraining the movement of the operating arm whereby the pawl is restrained from movement by its urging means, and means for selectively releasing the restraining means to allow the pawl to move in the predetermined direction under the influence of its urging means.

10. In a positive engaging clutch having a device which is adapted to be engaged to effectuate a clutching together of a driving and driven means, said device comprising a ring having a plurality of clutching serrations formed thereon, a drum having a plurality of clutching serrations formed thereon, said clutching serrations on the ring and drum being spaced apart the same distance, means for mounting the ring on the radial side face of the drum for relative movement thereon, resilient means interconnecting the drum and the ring for maintaining the position of the ring with respect to the drum in such a manner that the radial faces on the serrations of the ring laterally overlap the radial faces of the serrations on the drum, and means on the drum for limiting the effect of the resilient means so that the spaces between the serrations on the drum are not completely overlapped.

11. In a positive engaging clutch, a first multi-toothed driving ring, a second multi-toothed driving ring, said teeth on each of the driving rings having equal circular pitches and dedendum circles, biasing means for moving one ring relative to the other to partially close the space between the teeth, a driven element of such size as to fit between the exposed spaces of the teeth when said teeth are in overlapping relationship, and means for selectively moving said driven element into a space between said teeth whereby the engaged ring moves relative to the other ring against the effect of the biasing means.

References Cited in the file of this patent

UNITED STATES PATENTS

| | | |
|---|---|---|
| 521,257 | Browne | June 12, 1894 |
| 1,737,907 | Arnold | Dec. 3, 1929 |
| 1,883,966 | Krause | Oct. 25, 1932 |
| 2,061,684 | Spence | Nov. 24, 1936 |
| 2,202,402 | Rueb | May 28, 1940 |
| 2,399,098 | Carnagua et al. | Apr. 23, 1946 |
| 2,407,558 | Kress | Sept. 10, 1946 |
| 2,519,848 | Osterdahl | Aug. 22, 1950 |
| 2,577,199 | Klopner | Dec. 4, 1951 |
| 2,667,252 | Meyer | Jan. 26, 1954 |

FOREIGN PATENTS

| | | |
|---|---|---|
| 418,328 | Great Britain | Oct. 23, 1934 |